United States Patent [19]

Zimmermann

[11] Patent Number: 5,603,564
[45] Date of Patent: Feb. 18, 1997

[54] HOUSING FOR TWIN WORM-GEAR PRESS WITH INTERNAL INSERT TO REDUCE WEAR OF HOUSING

[75] Inventor: Anton Zimmermann, Mühledorf, Switzerland

[73] Assignee: Antogi AG, Mauren, Liechtenstein

[21] Appl. No.: 625,045

[22] Filed: Mar. 29, 1996

Related U.S. Application Data

[63] Continuation of Ser. No. 295,724, filed as PCT/CH93/00294, Dec. 29, 1993, published as WO94/15769, Jul. 21, 1994, abandoned.

[30] Foreign Application Priority Data

Dec. 31, 1992 [CH] Switzerland ............... 3999/92

[51] Int. Cl.$^6$ ............... B29B 7/48; B29B 7/58
[52] U.S. Cl. ............... 366/77; 366/80; 366/85
[58] Field of Search ............... 366/69, 76, 83–85, 366/90, 96–97, 297–301, 302, 307, 77, 80, 192, 193; 425/204, 208, 209; 222/272, 413

[56] References Cited

U.S. PATENT DOCUMENTS

| | | | |
|---|---|---|---|
| 2,488,189 | 11/1949 | Hanson | 366/84 X |
| 3,154,808 | 11/1964 | Ahlefeld, Jr. et al. | 366/77 X |
| 3,192,564 | 7/1965 | Beck et al. | 366/80 |
| 3,419,250 | 12/1968 | Brennan, Jr. | 366/193 X |
| 3,630,689 | 12/1971 | Wheeler et al. | 366/85 X |
| 3,696,736 | 10/1972 | Studli | 425/204 X |
| 3,704,866 | 12/1972 | Mosher et al. | 366/80 |
| 3,764,118 | 10/1973 | Matsuoka | |
| 3,804,381 | 4/1974 | Bielfeldt et al. | 425/208 X |
| 3,874,090 | 4/1975 | McCracken | 100/145 X |
| 3,904,719 | 9/1975 | Fritsch | 425/204 X |
| 4,136,968 | 1/1979 | Todd | 366/85 |
| 4,205,919 | 6/1980 | Attwell | 366/193 X |
| 4,310,251 | 1/1982 | Scharer et al. | 366/83 X |
| 4,332,481 | 6/1982 | Inoue et al. | 366/84 |
| 4,380,379 | 4/1983 | Hashizume et al. | 366/84 X |
| 5,180,225 | 1/1993 | Piccolo, Sr. et al. | 366/84 X |

FOREIGN PATENT DOCUMENTS

| | | | |
|---|---|---|---|
| 513431 | 11/1992 | European Pat. Off. | |
| 2632892 | 12/1989 | France | |
| 5824405 | 2/1983 | Japan | 366/77 |
| 602329 | 1/1985 | Japan | 425/204 |
| 61-266206 | 11/1986 | Japan | 366/100 |
| 299305 | 4/1990 | Japan | 366/85 |
| 595168 | 2/1978 | U.S.S.R. | 366/85 |
| 1514623 | 10/1989 | U.S.S.R. | |
| 1761523 | 9/1992 | U.S.S.R. | 366/85 |

*Primary Examiner*—Charles E. Cooley
*Attorney, Agent, or Firm*—Darby & Darby, P.C.

[57] ABSTRACT

A retruder having a housing with a pair of counter-rotating worm gears axially mounted within said housing for counter-rotation to process a medium. The housing has an inlet and also an outlet through which the processed medium is discharged which is transverse to (radially of) the housing axis. An insert in the housing is selectively slidably movable along the housing axis to overlie the outlet to adjust its size.

14 Claims, 2 Drawing Sheets

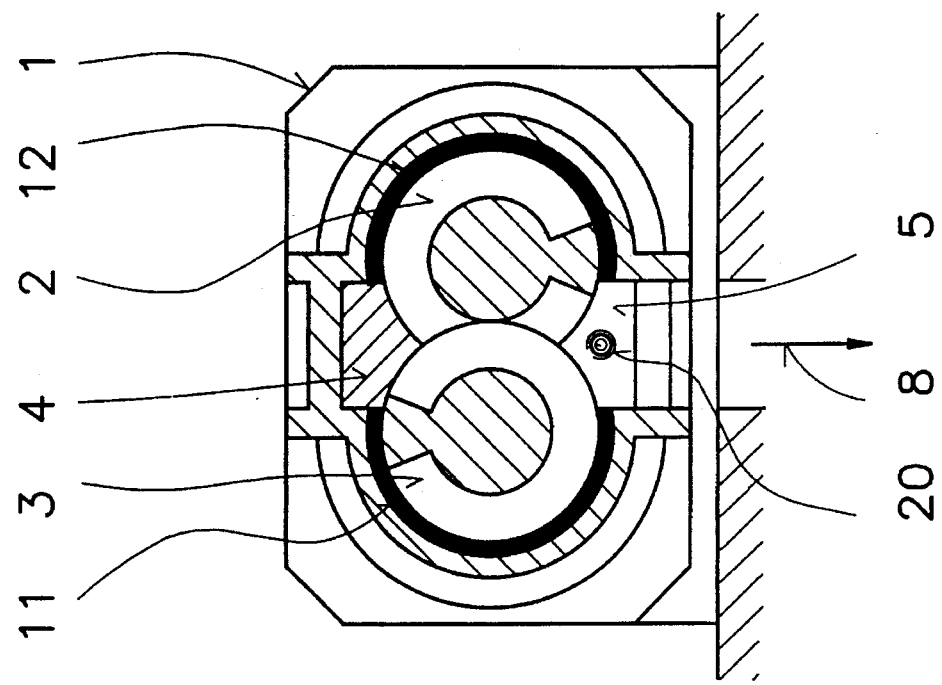
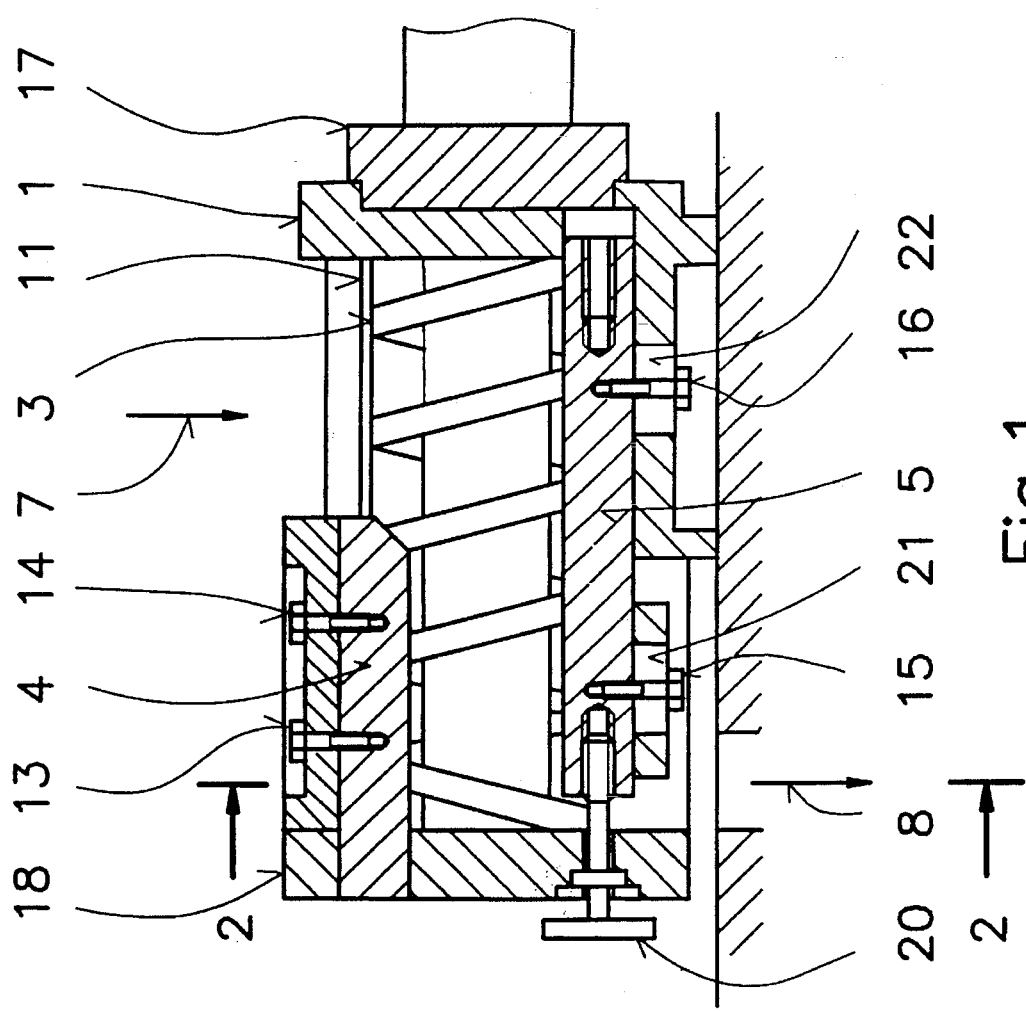
Fig. 2
Fig. 1

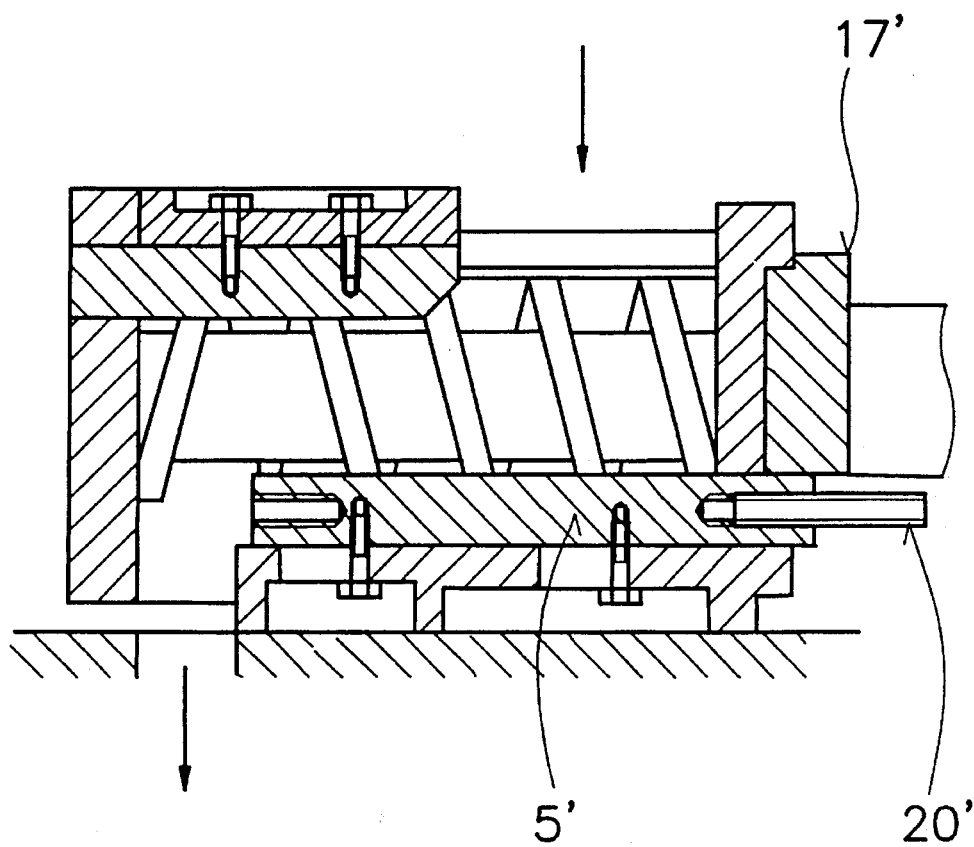
Fig.3
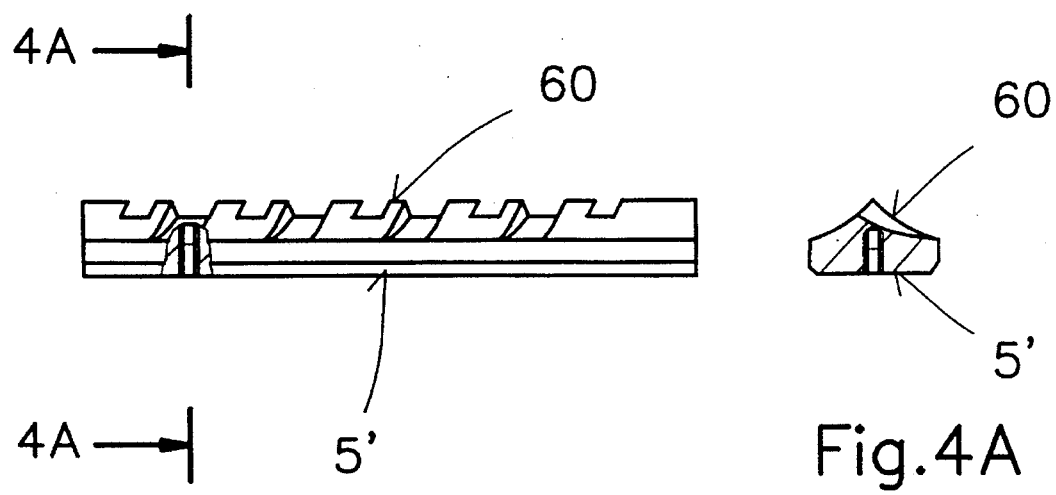
Fig.4
Fig.4A

HOUSING FOR TWIN WORM-GEAR PRESS WITH INTERNAL INSERT TO REDUCE WEAR OF HOUSING

RELATED APPLICATION

This is a continuation of application Ser. No. 08/295,724, filed Aug. 19, 1994, now abandoned, which corresponds to International Application PCT/CH93/00294 Dec. 29, 1993, published as WO94/15769, Jul. 21, 1994.

FIELD OF THE INVENTION

The invention relates to a twin worm-gear press for continuously conveying, mixing and/or kneading media at elevated pressure. The term extruder has become established for apparatus of this type. A preferred embodiment of the present invention applies to the housing of a retruder (reverse extruder) in which, because as a result of the reversal of the direction of conveying the media, the inner wall of the housing is under a high load and uses an adjustable insert to control the size of the retruder outlet opening.

BACKGROUND OF THE INVENTION

Continuous conveying, mixing and/or kneading of media is part of the basic operations of process engineering. The material for mixing and/or conveying can be very different substances. The chemical and physical properties of these substances, their state of aggregation and their behavior under pressure and heat can be correspondingly different. The prior art provided in mechanical engineering include a wide variety of mechanisms such as kneaders for chocolate composition, the production of semifinished plastics by extrusion, the processing of flowable plastics granules with a glass fiber content for injection molding, and the disposal of biologically active waste.

For all these tasks there are known machines which have, depending on the requirements, cooled or heated housings and at least two rotating, mutually meshing conveying screws. On such type of mechanism is called a retruder. Such a device is disclosed and claimed in application Ser. No. 08/211,008, by the invertor, filed on Jul. 18, 1994. This differs from an extruder, which is an injection type of device and produces a high pressure at the end of the worm. A retruder is not an injection device and its object is to reduce pressure at the worm outlet. Further, while the object of an extruder is to generate pressure, a retruder produces torsional forces. Also, the outlet of an extruder is in the direction of the worms whereas in a retruder it is generally perpendicular.

The retruder produces a pressure build-up by forcibly conveying the medium in the individual, closed windings of the screw channel, without having a reactive effect on the mass transport. One of the weak points of this construction is the housing, since the conveying pressure produces peripheral stresses in the housing casing and the friction of the medium results in abrasion and wear of the housing inner face. In particular, this disadvantage becomes important when processing abrasive media or when the high pressures in the medium for the purpose of increasing the frictional forces in the medium are themselves advantageous. This is the case with kneading tasks if the efficiency of kneading is increased or for example in the case of a frictional reactor which is to be operated at high operating pressures as a thermo-mechanical process unit for a biomass. According to the prior art, either the entire housing of the screws, or an integrated plating of the housing, or the surface of the screws, is produced from wear-resistant materials in order to locally protect the locations at risk from material abrasion Cobalt and nickel alloys according to DIN 8555 and hard metal alloys of known type are standard as a protection against wear.

The disadvantage of this solution is the relatively short service life of the protection against wear at the exposed locations. This is because it is precisely at the line of penetration of the screw casing where the mechanical abrasion is the greatest that the plating has to be applied and the localized reduction in the protection against wear has to be accepted.

A further disadvantage of the twin screw retruders is the fact that there is no means of optimizing the screw extrusion in operation other than the relatively complicated speed regulation of the screws.

BRIEF DESCRIPTION FOR THE INVENTION

The object of the present invention is to enable adjustment of the pressure build-up and the frictional forces within the medium, for forcible conveying of the medium in the screw channel of a twin screw retruder, with or without thrust reversal, and to increase the service life of the machine. In accordance with the invention, this object is achieved by providing an insert within the housing that is adjustable along the axis of the housing, to control the dimensions of the retruder outlet. This insert, as well as another insert against which the screws operate, are replaceable.

The advantages achieved by the invention reside, substantially for existing tasks, in the increase in the steadiness of the kneading output, despite a fluctuating quality and quantity of the conveyed material (e.g., when introducing and ejecting a batch), in the increase in the service life of the screw retruder this increases the availability of the machine and because of these advantages makes it available for use in new processes.

BRIEF DESCRIPTION OF THE DRAWINGS

The invention will be described by way of example with reference to the attached drawings in which:

FIG. 1 shows the longitudinal section of a screw retruder with thrust reversal;

FIG. 2 shows the cross-section through the screw retruder of FIG. 1 along lines 2—2 of FIG. 3;

FIG. 3 is a longitudinal section of an alternate embodiment of retruder;

FIG. 4 is a side view of the insert; and

FIG. 4A is a cross-section of the insert along lines 4A—4A of FIG. 4.

DETAILED DESCRIPTION OF THE INVENTION

The screw retruder in FIGS. 1 and 2 comprises a housing 1 and mutually meshing worm gears 2, 3 which are mounted between the front panel 18 and the bearing block 17. The worm gears are constructed as a retruder, with reversing pitches and for the purpose of thrust reversal, as reversible worm gears. Provided around the screws 2, 3 in the housing is plating 11 and 12 in the region of the penetration line of the screws 2, 3. As an extension to the protection against wear of the plating 11 and 12, there are also insert parts 4 and 5. The insert part 4 is preferably fixed in the interior of the housing by bolts 13, 14 whose heads are accessible from outside of the housing while the insert part 5 is slidably displaceable along a part of the length of the housing and is held in position by screws 15, 16 extending through slots 21, 22. As seen in FIG. 1, the lengths of the part of the inserts 4 and 5 within the housing is less than the length of the screws.

The term "reversible screw" indicates the particular property of these screws, since both reversible screws change their direction of conveying to the reverse direction by the inversion of their pitch angles. A further property of the two reversible screws 2, 3 is that they rotate in opposite directions and in meshing manner. In the region of the points of reversal of the pitch angles of the screws 2, 3 the meshing is performed such that the turning windings of the reversible screws 2, 3 roll on one another in the manner of double helical gearwheels.

From the inlet 7, the medium passes into the screw channel of the screws 2, 3. It is conveyed, as a result of the rotation of screws 2, 3 in opposite directions forcibly in the individual turns which are closed by the windings of the screw channel, the housing inner wall comprising the plating 11, 12 and the two insert parts 4, 5, and the mutually meshing screws 2, 3 as far as the points of reversal. The medium mass transport conveyed in the reverse direction presses against this medium mass flow from the point of reversal. Depending on the counter-pressure of the reverse direction, the frictional force in the medium is increased. Finally, the winding of the reverse direction allows the transport of the medium mass to advance to the outlet 8.

An adjusting spindle 20 is used to position the insert part 5 relative to the front panel 18 of the housing 1 to adjust the size of the outlet 8. As the outlet is closed or narrowed the screw pressure increases. The screw pressure is lowered if the outlet 8 is widened by pushing the insert part to open outlet 8. Operation of the adjusting spindle 20 can be carried out both by hand or by a controlled or regulated drive (not shown). The quality of the medium measured such as by determining the load bearing of the screws 2, 3 by a sensor located in the front panel 18, or a pressure sensor (not shown) which is integrated between the insert part 5 and the base of the housing 1, can serve as the regulating variable.

For wear, the exposed zone of the insert part 5 facing the outlet 8 is decisive. The symmetrical form of the insert part 5 allows the insert part 5 to be turned and thus its service life can be increased. If the adjusting spindle 20 is arranged on the bearing block side 17, then it is possible to remove the insert part 5, or the insert part 4, through the front panel 18 without dismantling the twin screw extruder.

Depending on requirements, the housing 1 of the twin screw retruder can be provided with a casing (not shown) which is common and/or divided as desired and which permits heating and/or cooling.

FIGS. 3, 4 and 4A show another embodiment of the invention. Here the insert 5' includes a thread 60 that faces the threads of the worms 2, 3. The insert thread 60 meshes with the worm threads to provide a more vigorous kneading of the medium processed through the retruder. The insert 5' is adjustable within the length of the housing interior by the spindle 20' on the bearing block side 17'. Insert 4' also can have a thread 60 to mesh with the worm threads.

I claim:

1. A retruder for processing a medium comprising:

a housing having an inner wall, said housing also having a longitudinal axis with an inlet opening for receiving the medium and a discharge opening said inlet opening and said discharge opening each positioned generally transverse to the housing longitudinal axis;

a pair of worm gears within the housing each with a thread thereon aligned opposing each other along the housing axis with the threads in meshing relationship; and an insert within said housing extending along a portion of the length of said gears and having an outer surface adjacent the housing inner wall and an inner surface facing the threads of said pair of worm gears, said gears rotating in opposite directions to process the medium admitted into the housing through said inlet opening and move the medium long the housing interior between the threads of said gears and the inner surface of said insert out of the housing through said discharge opening.

2. A retruder as in claim 1 wherein said insert is slidable along the housing axis over said outlet opening to adjust the size of said opening.

3. A retruder as in claim 2 wherein said insert is slidable along the inner wall of said housing and further comprising fastening means for fastening said insert to a desired position within said housing.

4. A retruder as in claim 2 wherein said insert is of shorter length than the length of said worm gears.

5. A retruder as in claim 4 further comprising a spindle connected to said insert and adjustable axially of said housing to position the insert along the axis of the housing.

6. A retruder as in claim 1 wherein said insert is slidable along the inner wall of said housing and further comprising fastening means for fastening said insert to a desired position within said housing.

7. A retruder as in claim 6 further comprising a spindle connected to said insert and adjustable axially of said housing to position the insert along the axis of the housing.

8. A retruder as in claim 1 wherein said insert is of shorter length than the length of said worm gears.

9. A retruder as in claim 1 wherein said housing has an opening at an end thereof through which said insert is removable.

10. A retruder as in claim 1 wherein said inlet opening is adjacent one end of said housing and said discharge opening is at the other end of said housing.

11. A retruder as in claim 1 wherein the inner surface of said insert opposing said worm gears has a thread that meshes with the threads of the worm gears.

12. A retruder as in claim 11 further comprising a second insert within said housing opposite said first named insert also having a thread on its inner face facing the worm gears and meshing with the threads of the worm gears.

13. A retruder as in claim 1 wherein said pair of worm gears have axes in parallel and said insert is of sloped shape with a peak between said worm gears.

14. A retruder as in claim 1 further comprising a second insert having an inner surface within said housing spaced angularly around said axis relative to said first named insert, the medium also passing between the inner surface of said second insert and said threads of said worm gears.

* * * * *